June 5, 1934.   E. J. SCHAEFER   1,961,793
ADJUSTABLE SPEED SPLIT PHASE MOTOR
Filed Nov. 18, 1933

Inventor:
Edward J. Schaefer,
by Harry E. Dunham
His Attorney.

Patented June 5, 1934

1,961,793

UNITED STATES PATENT OFFICE 1,961,793

ADJUSTABLE SPEED SPLIT PHASE MOTOR

Edward J. Schaefer, Fort Wayne, Ind., assignor to General Electric Company, a corporation of New York Application November 18, 1933, Serial No. 698,623

7 Claims. (Cl. 172—279)

My invention relates to multi-speed single phase motors of the type using a split phase winding for starting the motor, and its object is to provide a satisfactory multi-speed motor of this character without using external voltage changing equipment or complicated switches.

In carrying my invention into effect, I provide the motor with two or more running windings having different pole numbers for the different speeds desired. The motor is also provided with a starting winding having a pole number equal to the pole number of one of the main windings. These last mentioned two windings are used to start the motor. To simplify switching, the windings used for starting may be left connected in a parallel circuit when operating the motor on a winding of a different pole number. This is feasible since the windings of different pole numbers are non-inductive with respect to each other and no currents are induced into the windings used for starting when running on a winding of different pole number.

The invention may be used with either a plain split phase starting arrangement or one where a phase modifying device such as a condenser is used in the starting winding circuit.

Figure 1:
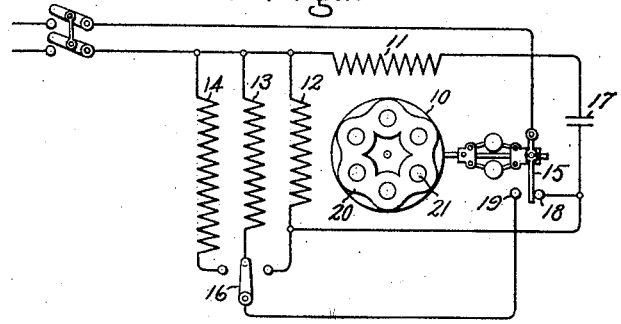
Figure 2:
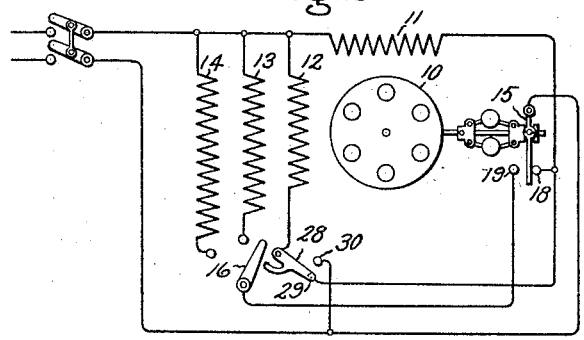
Figure 3:
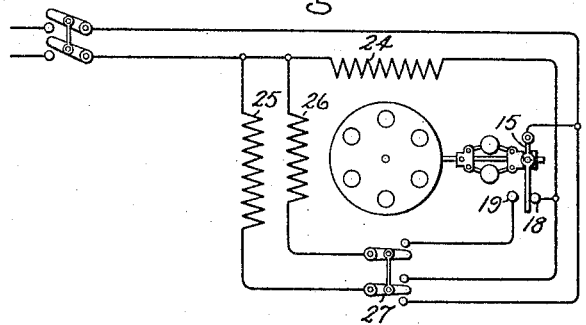

The features of my invention which are believed to be novel and patentable will be pointed out in the claims appended hereto. For a better understanding of my invention, reference is made in the following description to the accompanying drawing, illustrating in Fig. 1, the invention as applied to a three speed condenser motor; in Fig. 2, the invention as applied to a three speed plain split phase motor. In Figs. 1 and 2, the motor is started, using the windings of low pole number. Fig. 3 shows a two speed straight split phase motor where the motor is started, using the high pole number windings.

Referring now to Fig. 1, I have represented a single phase condenser motor having a squirrel cage type of rotor 10, a starting winding 11, and three main windings 12, 13 and 14. It will be assumed that windings 11 and 12 are wound for two poles, winding 13 for four poles, and winding 14 for six poles. It will be noted that the two pole main and starting windings 12 and 11 are permanently connected in parallel circuits. The motor only requires, in addition to a usual form of speed responsive switch represented at 15, a simple three point single blade speed selecting and control switch 16. A relatively small condenser 17 is included in the starting winding circuit. The single phase line terminals are connected, one to the common point of all the primary windings and the other to the movable contact of the speed responsive switch 15. It will be understood that windings 11 and 12 are angularly displaced usually about 90 degrees. It is unnecessary that either of the windings 13 and 14 have any particular angular displacement with respect to any other winding and, consequently, they may be wound to the best advantage as regards other design features.

The speed responsive switch is shown in the starting position on contact 18 and in this position it connects starting winding 11 with the condenser 17 in series and winding 12 in parallel across the line contacts. When the line switch is closed, the motor will start as a condenser split phase motor. It is generally desirable to make the starting winding pole number the same as the lowest pole number main winding as ordinarily this provides the greatest starting torque. The speed responsive switch should be set to operate just below the lowest single phase running speed.

When such speed is reached, the switch 15 moves from contact 18 to contact 19. The windings used at start are thus disconnected from the line at contact 18. Contact 19, which becomes connected to the line through the speed responsive switch 15, is connected to the speed selecting switch 16. For the position of switch 16 shown in the drawing, the motor will operate single phase on the four pole winding 13. It will be observed that this switch 16 can be set in advance or changed at will during normal operation to select or obtain the desired operating speed.

In case switch 16 is on or moved to the contact leading to the two pole winding 12, it will be evident that the motor will operate with the starting winding and condenser in circuit even after the speed responsive switch operates. Thus for the highest speed and generally maximum load condition, the added benefit of the capacitance starting winding is available.

It will be observed that when operating on either winding 13 or 14, windings 11 and 12 are included in a closed circuit with the condenser 17. It might be thought that detrimental currents will flow in this closed circuit under these conditions. This does not occur, however, if proper care is used in the motor design and selection of the condenser since the two pole windings are non-inductive with respect to the fluxes produced by the four and six pole windings. It is, therefore, feasible to leave the parallel connected motor starting circuits in the permanently closed circuit described, thereby simplifying the switching.

In a permanent split phase capacitor motor, such as motor of Fig. 1 is when started and operated on the two pole windings 11 and 12, it is necessary to use a high resistance rotor to obtain high starting torque. However, when this motor is operating single phase on one of the higher pole number windings 13 or 14, it is desirable from the standpoint of efficiency to have a low resistance rotor. By placing most of the resistance of the squirrel cake winding in the end rings 20 and providing low resistance bars 21, I am able to obtain a relatively high resistance secondary when operating on the two pole windings 11 and 12, and a relatively lower resistance secondary when operating on the higher pole number windings 13 and 14. The main reason for this is that when operating on the two pole windings, the squirrel cage current must travel around through the end rings half their peripheral length whereas, when using the higher pole number windings, the distance which the secondary current travels around the end rings is proportionally less. Thus, the secondary resistance is roughly inversely proportional to the number of poles of the primary flux when most of the resistance is placed in the end rings as here contemplated by using large low resistance bars and high resistance end rings of relatively small cross section or of high resistance material. Such a motor, therefore, has among others, the following desirable features and characteristics:—good starting torque, stable speed characteristics at all operating speeds, reasonably good efficiency at all operating speeds, and the obtaining of a multi-speed motor by a relatively simple switching arrangement.

In Fig. 2, the invention is modified slightly and applied to a straight phase split motor or a motor which uses no external phase modifying device such as a condenser in the starting winding circuit. In such a motor, the angularly displaced windings used for starting the motor have different time constants, for example, the winding 11 may have a high resistance as compared to winding 12 to obtain the necessary phase split. In such a motor, it is desirable to cut the starting winding out of circuit after starting when running on the main winding 12 of the same pole number, and the switching is modified to accomplish this result. The pole number of the windings represented in Fig. 2 are assumed to be the same as the windings similarly identified in Fig. 1.

In Fig. 2, the main and start windings 12 and 11 of like pole number are not permanently connected in parallel but may be connected in parallel through a switch arm 28 and contact 29 associated with the speed selecting switch 16 when the latter is in other than the position for operating on main winding 12. When arm 16 is moved to operate on main winding 12, switch arm 28 is moved from contact 29 to a line contact 30.

With this arrangement, it is seen that with the speed selecting switch 16 positioned for operation on winding 12, windings 11 and 12 of like pole number are energized in parallel at start, winding 12 through arm 28 and contact 30 and winding 11 through the speed responsive switch 15 on contact 18. After the speed responsive switch operates and moves to contact 19 the starting winding is deenergized and single phase operation is obtained with winding 12 alone. If the speed selecting switch 16 is moved to operate on winding 13 or winding 14, switch arm 28 moves to contact 29 and connect the main and start windings 12 and 11, of like pole number, in parallel. The motor will, therefore, start on these windings as before and these parallel connected windings will be deenergized but remain connected in parallel as the motor comes up to speed and switch arm 15 moves to contact 19 to energize the speed selecting switch 16.

The simplicity of this speed responsive switch is therefore retained and the speed selecting switch 16 is not further complicated with the need of providing mechanism to open the parallel connections between windings 11 and 12 when it is desired to use windings 13 or 14 for normal operation. It will also be noted that, while in normal operation, the operating speed may be changed by moving the speed selecting switch arm 16 to any position desired without energizing starting winding 11 and without causing any short circuit condition.

Fig. 3 represents a two speed straight split phase starting motor in which the low speed high pole number windings are used at start. In this motor 24 and 25 are the start and main windings of higher pole number, and 26 is the the high speed running winding of low pole number.

For high speed operation, the switch 27 is thrown up and, for low speed operation, it is thrown down. When the speed selecting switch is up, the motor starting circuits may be traced as follows: from the upper line contact to speed responsive switch 15, contact 18, and parallel path through field 24 and through the middle contacts of switch 27 and winding 25 back to the line. When the speed responsive switch 15 operates, windings 24 and 25 are deenergized at contact 18 and winding 26 is energized through contact 19 of the speed responsive switch and the upper contacts of switch 27.

For low speed operation with switch 27 down, the starting circuits, are for winding 24, through contact 18 of the speed responsive switch and, for winding 25, through the lower right contact of switch 27. When the speed responsive switch operates, winding 24 is cut out and the energizing circuit for winding 25 remains unchanged. It will be noted that for high speed running, windings 24 and 25 remain connected in parallel which does no harm since these windings are non-inductive to the flux produced by winding 26 which is then energized.

The invention may be applied to motors having any number of running windings of different pole numbers within limits of practicability. The number of such windings, the pole number of the windings used for starting, the matter of using an external phase splitting device, and the details of the switching arrangement will vary with service requirements and I do not wish to limit my invention in these respects.

What I claim as new and desire to secure by Letters Patent of the United States, is:—

1. A multispeed, single phase, split phase motor having a plurality of main windings of different pole numbers, a starting winding having a pole number equal to the lowest pole number main winding, a squirrel cage secondary having low resistance bars and high resistance end rings such as to give the effect of a comparatively high resistance rotor when the low pole number windings are energized and a comparatively lower resistance rotor when a lower pole number winding is energized, a speed responsive switch having starting and running positions, a speed selecting switch for selecting the main winding to be energized for normal operation, single phase terminals, one connected to one end of all of said windings and the other connected to the movable element of the speed responsive switch, a stationary contact for the speed responsive switch through which the main and starting windings of lowest pole number are energized in parallel when this switch is in its starting position and a stationary contact for the speed responsive switch connected to the speed selecting switch and energized through the speed responsive switch when the latter is in its running position.

2. A multispeed, single phase, split phase motor having a plurality of non-inductively related main windings of unlike pole number for use in operating the motor at different speeds, a starting winding of the same pole number as one of said main windings and for use therewith for starting the motor, a double throw single pole speed responsive switch having starting and running positions and corresponding stationary contacts, a single pole manual speed selecting switch having stationary contacts and corresponding positions for connecting the movable pole thereof with the different main windings, single phase terminals, one connected to one end of all of said windings and the other connected to the movable pole of the speed responsive switch such that the motor windings can only be energized through said speed responsive switch in one or the other of its positions, a connection between the movable pole of the speed selecting switch and the running contact of the speed responsive switch, and connections for energizing the main and starting windings of like pole number in parallel through the speed responsive switch in the starting position of the latter independently of the speed selecting switch.

3. A multispeed, single phase, split phase motor having at least two main windings of unlike pole numbers for use in operating the motor at different speeds, a starting winding having a pole number equal to that of one of said main windings, a single pole double throw speed responsive switch having starting and running positions, a speed selecting switch for selecting the main winding to be energized when the speed responsive switch moves to its running position, single phase supply terminals, one connected to one end of all of said windings and the other connected to the movable pole of the speed responsive switch and connections between said switches and windings such that the main and starting windings of like pole number are energized in parallel when the speed responsive switch is in its starting position and the speed selecting switch is in any of its speed selecting positions, and such that the last mentioned windings are connected in parallel but deenergized when the speed responsive switch is in its running position and the speed selecting switch is positioned to selectively energize any other main winding.

4. A multispeed, single phase, split phase motor having a starting winding and a plurality of main windings, the latter having different pole numbers, one having the same pole number as the starting winding, permanent connections for connecting the main and starting windings of like pole numbers in parallel circuits, a speed responsive switch through which the motor is energized having starting and running positions, the starting position energizing said parallel circuits, and a speed selecting switch for determining the main winding to be energized through the speed responsive switch when the latter is in its running position.

5. A multi-speed single phase, split phase motor having a plurality of main windings of different pole number, a starting winding having the same pole number as the lowest pole number main winding, a condenser connected in series with said starting winding and the circuit thus formed permanently connected in parallel with the main winding of lowest pole number, a squirrel cage rotor for said motor having low resistance bars and high resistance end rings such as to produce materially different secondary resistance effects depending upon the pole number of the winding or windings energized, single phase supply terminals, one terminal connected to one end of all of said windings, a single pole double throw speed responsive switch having its movable member connected to the other supply terminal, and having a pair of stationary contacts with which the movable member alternately engages in the starting and running positions of said movable member, and a single pole speed selecting switch having its movable member connected to the running contact of the speed responsive switch and having a plurality of stationary contacts connected to the other ends of the different main windings.

6. A multispeed, single phase, split phase motor having a plurality of main windings of different pole number, a starting winding having a pole number equal to the pole number of one of the main windings, a condenser, permanent connections connecting the condenser in series with the starting winding and the starting winding circuit thus formed in parallel with the main winding of like pole number, single phase supply terminals, one connected to all of said windings, a single pole double throw speed responsive switch having its movable member connected to the other supply terminal, a manual single pole speed selecting switch having stationary contacts and corresponding positions for connection to the different main windings, and connections for energizing the aforementioned parallel connected winding circuits when the speed responsive switch is in its starting position and for energizing the movable member of the speed selecting switch when the speed responsive switch is in its running position.

7. A two speed, single phase, split phase motor having main and starting windings of the same pole number and a main winding of a smaller pole number which is noninductive with respect to the first mentioned windings, single phase supply terminals, one connected to all of said windings, a single pole double throw speed responsive switch having its movable member connected to the other supply terminal and making contact alternately with stationary contacts in its starting and running positions, a speed selecting switch connected between the speed responsive switch and the other ends of said main windings, said speed selecting switch having one position where the lower pole main winding is connected therethrough to the running contact of the speed responsive switch and the high pole main winding is connected therethrough to the starting contact of the speed responsive switch and to the other end of the starting winding and having another position where the high pole main winding is connected therethrough to said other side of said source with the other windings open.

EDWARD J. SCHAEFER.